US010782692B2

(12) United States Patent
Tamura et al.

(10) Patent No.: US 10,782,692 B2
(45) Date of Patent: Sep. 22, 2020

(54) SHIP HANDLING DEVICE

(71) Applicant: Yanmar Co., Ltd., Osaka-shi, Osaka-fu (JP)

(72) Inventors: Gakuji Tamura, Osaka (JP); Daisuke Irahara, Osaka (JP); Akiyoshi Hayashi, Osaka (JP)

(73) Assignee: YANMAR CO., LTD., Osaka (JP)

(*) Notice: Subject to any disclaimer, the term of this patent is extended or adjusted under 35 U.S.C. 154(b) by 24 days.

(21) Appl. No.: 16/060,872

(22) PCT Filed: Jun. 24, 2016

(86) PCT No.: PCT/JP2016/068851
§ 371 (c)(1),
(2) Date: Jun. 8, 2018

(87) PCT Pub. No.: WO2017/098744
PCT Pub. Date: Jun. 15, 2017

(65) Prior Publication Data
US 2019/0041857 A1    Feb. 7, 2019

(30) Foreign Application Priority Data

Dec. 11, 2015 (JP) ................................ 2015-242464

(51) Int. Cl.
*G05D 1/00* (2006.01)
*G05D 1/02* (2020.01)
(Continued)

(52) U.S. Cl.
CPC .......... *G05D 1/0208* (2013.01); *B63H 25/02* (2013.01); *B63H 25/42* (2013.01); *B63H 2025/026* (2013.01)

(58) Field of Classification Search
USPC ......................................................... 701/21
See application file for complete search history.

(56) References Cited

U.S. PATENT DOCUMENTS

| 5,983,145 A * | 11/1999 | Becker ................. G05D 1/0206 701/21 |
| 2006/0160440 A1* | 7/2006 | Ishida .................... B63H 21/21 440/87 |

(Continued)

FOREIGN PATENT DOCUMENTS

| JP | H01-148696 A | 6/1989 |
| JP | 2001304909 A * | 10/2001 |

(Continued)

OTHER PUBLICATIONS

International Search Report dated Sep. 6, 2016 issued in corresponding PCT Application PCT/JP2016/068851 cites the patent documents above.

*Primary Examiner* — James M McPherson
(74) *Attorney, Agent, or Firm* — Norton Rose Fulbright US LLP

(57) ABSTRACT

A ship handling device capable of executing dynamic positioning control. While the dynamic positioning control is being active, if a distance deviation from a target position exceeds a predetermined value and a first condition that a state where a moving amount of the ship per unit time is not more than a predetermined amount has continued for a predetermined period is satisfied, or if an orientation deviation from a target orientation exceeds a predetermined value and a second condition that a state where a turning amount of the ship per unit time is not more than a predetermined amount has continued for a predetermined period is satisfied, a thrust setting value resulting from the dynamic positioning control at a determination on the first or second condition is stored as a reference value, and the reference value is added to a thrust setting value subsequently resulting from the dynamic positioning control.

19 Claims, 8 Drawing Sheets

(51) Int. Cl.
*B63H 25/42* (2006.01)
*B63H 25/02* (2006.01)

(56) References Cited

U.S. PATENT DOCUMENTS

| | | | | |
|---|---|---|---|---|
| 2007/0162207 | A1* | 7/2007 | Shimo | B63H 25/04 |
| | | | | 701/42 |
| 2009/0043436 | A1* | 2/2009 | Igarashi | B63H 25/42 |
| | | | | 701/21 |
| 2010/0153013 | A1* | 6/2010 | Kondo | B63B 49/00 |
| | | | | 701/301 |
| 2011/0082644 | A1* | 4/2011 | Imasaka | A01K 97/00 |
| | | | | 701/494 |
| 2011/0307128 | A1 | 12/2011 | Igarashi et al. | |
| 2013/0019790 | A1 | 1/2013 | Flint et al. | |

FOREIGN PATENT DOCUMENTS

| | | |
|---|---|---|
| JP | 2005-096771 A | 4/2005 |
| JP | 2006-297976 A | 11/2006 |
| JP | 2010-105551 A | 5/2010 |
| JP | 2010-173589 A | 8/2010 |

\* cited by examiner

SHIP HANDLING DEVICE

CROSS REFERENCES TO RELATED APPLICATIONS

This application is a national stage application pursuant to 35 U.S.C. § 371 of International Application No. PCT/JP2016/068851, filed on Jun. 24, 2016, which claims priority under 35 U.S.C. § 119 to Japanese Patent Application No. 2015-242464, filed on Dec. 11, 2015, the disclosures of which are hereby incorporated by reference in their entireties.

TECHNICAL FIELD

The present invention relates to a ship handling device for a ship, the ship handling device being capable of executing dynamic positioning control for balancing a thrust of the ship with an external force acting on the ship so that a position and an orientation of the ship are maintained at a target position and a target orientation, respectively.

BACKGROUND ART

Traditionally, there is known dynamic positioning control for maintaining a position and an orientation of a ship at a target position and a target orientation, respectively. While this control is active, if a large external force including a wind force and a tidal force acts on the ship, a thrust of the ship may be balanced with the external force before the ship reaches the target position and the target orientation, and consequently the ship may stop moving and turning at a position away from the target position.

Meanwhile, a dynamic positioning device described in Patent Literature 1 (hereinafter, referred to as PTL 1) includes a position detecting means, an orientation detecting means, and an anemoscope for detecting a wind direction and a wind speed as an external force. In addition, the dynamic positioning device includes a proportional-integral-derivative (PID) controller and an addition processing means. The PID controller works out a control force and a moment to be added to the ship for making a deviation of a detected position from a setting position and a deviation of a detected orientation from a setting orientation zero. The addition processing means adds, to the control force and the moment thus worked out, a wind pressure component estimated from the wind direction and the wind speed having been detected. Then, based on output from the addition processing means, the dynamic positioning device calculates control operation amounts for a bow thruster, a variable pitch propeller, and a rudder, and controls the bow thruster, the variable pitch propeller, and the rudder.

CITATION LIST

Patent Literature

PTL 1: Japanese Patent Application Laid-Open No. H01-148696 (1989)

SUMMARY OF INVENTION

Technical Problem

Unfortunately, although the dynamic positioning device described in PTL 1 simply includes the integral (I) term in the PID control by the PID controller, this dynamic positioning device has a low operational response on the sea because the position is a second-order lag of the thrust. That is, the dynamic positioning device described in PTL 1 is likely to cause hunting, and thus cannot execute the dynamic positioning control efficiently and accurately.

In order to deal with this, some aspects of the present invention have an object to provide a ship handling device capable of executing dynamic positioning control efficiently and accurately.

Solution to Problem

A ship handling device for a ship according to an aspect of the present invention includes: a driving force source; a propulsion device; a position calculating device configured to calculate a position of the ship; and an orientation calculating device configured to calculate an orientation of the ship, wherein the ship handling device is capable of executing dynamic positioning control for balancing a thrust of the ship with an external force acting on the ship, and while the dynamic positioning control is active, in a case where a distance deviation from a target position is greater than a predetermined value and a first condition that a state where a moving amount of the ship per unit time is equal to or less than a predetermined amount has continued for a predetermined period of time is satisfied, or in a case where an orientation deviation from a target orientation is greater than a predetermined value and a second condition that a state where a turning amount of the ship per unit time is equal to or less than a predetermined amount has continued for a predetermined period of time is satisfied, a thrust setting value resulting from the dynamic positioning control at the time of determination on the first condition or the second condition is stored as a reference value, and the reference value is added to a thrust setting value subsequently resulting from the dynamic positioning control.

Preferably, the ship handling device according to the aspect of the present invention further includes a joystick lever, wherein while a state where the joystick lever is not operated is maintained, in a case where a ship speed is equal to or lower than a predetermined ship speed, in a case where the reference value is equal to or lower than a threshold, in a case where a state where a distance deviation from the target position is equal to or less than a predetermined distance has continued for a predetermined period of time, or in a case where a state where an orientation deviation from the target orientation is equal to or less than a predetermined angle has continued for a predetermined period of time, the ship handling device executes the dynamic positioning control in which the driving force source is operated at a rotation speed equal to or lower than a preset upper limit.

The ship handling device according to the aspect of the present invention is preferably configured such that while a state where the joystick lever is not operated is maintained, in a case where a ship speed is higher than the predetermined ship speed, in a case where the reference value is greater than the threshold, in a case where a distance deviation from the target position is greater than the predetermined distance, or in a case where an orientation deviation from the target orientation is greater than the predetermined angle, the ship handling device continuously performs the dynamic positioning control in which the limitation on the rotation speed has been canceled, the limitation causing the rotation speed to be equal to or lower than the upper limit.

Advantageous Effects of Invention

With the ship handling device according to the aspect of the present invention, the thrust setting value representing the thrust balanced with the external force is stored as the reference value. This makes it possible to cancel the external force acting on the ship, and to calculate a thrust setting value used to cause the ship to move closer to the target position. With such as control, it is possible to reduce overshoot and hunting, as compared with a configuration in which, each time one cycle of the control is completed, an external force is obtained by, e.g., calculation and the external force thus obtained is added to a thrust setting value that is to be outputted. Consequently, with the above control, it is possible to execute the dynamic positioning control efficiently and accurately. Hence, it is possible to provide a ship handling device capable of executing dynamic positioning control efficiently and accurately.

With the ship handling device according to the aspect of the present invention, the ship can achieve quietness, comfortability, and the like while the ship is located at or near the target position and the target orientation and is in a calm state where no external force acts on the ship.

With the ship handling device according to the aspect of the present invention, even in a case where output from the driving force source is reduced once, the limitation on the output can be canceled if the ship enters a state where an external force acts on the ship. Consequently, it is possible to impart, to the ship, both of quietness, comfortability, and the like while the ship is in a calm state and a good response while the ship is in a state where an external force acts on the ship.

DESCRIPTION OF EMBODIMENTS

Figure 1:
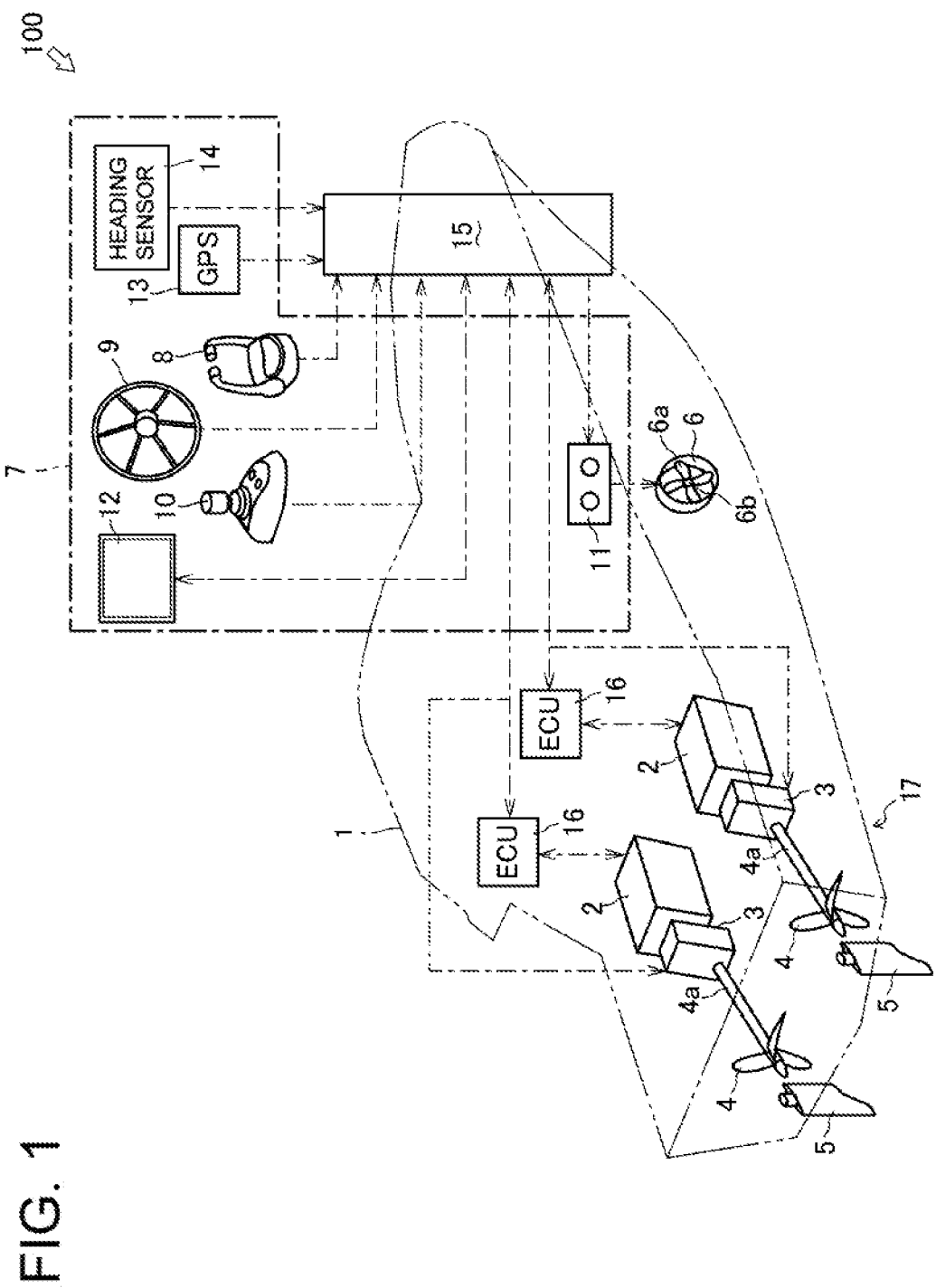
FIG. 1 A view schematically illustrating an overview of an entire ship including a ship handling device according to an embodiment of the embodiment.

First of all, with reference to FIGS. 1 to 3, an overview and a configuration of an entire ship 100 provided with a ship handling device 7 will be described. The ship 100 illustrated in FIG. 1 is a so-called twin-screw ship (shaft ship). However, the number of propeller shafts and the type of the propulsion device are not limited to those in the twin-screw ship. Alternatively, the ship 100 may be a ship provided with a plurality of shafts, an outdrive-type ship, or a podded ship. In the following description, a front-and-back direction and a left-and-right direction are defined with a bow direction of the ship 100 being defined as the front.

Figure 2:
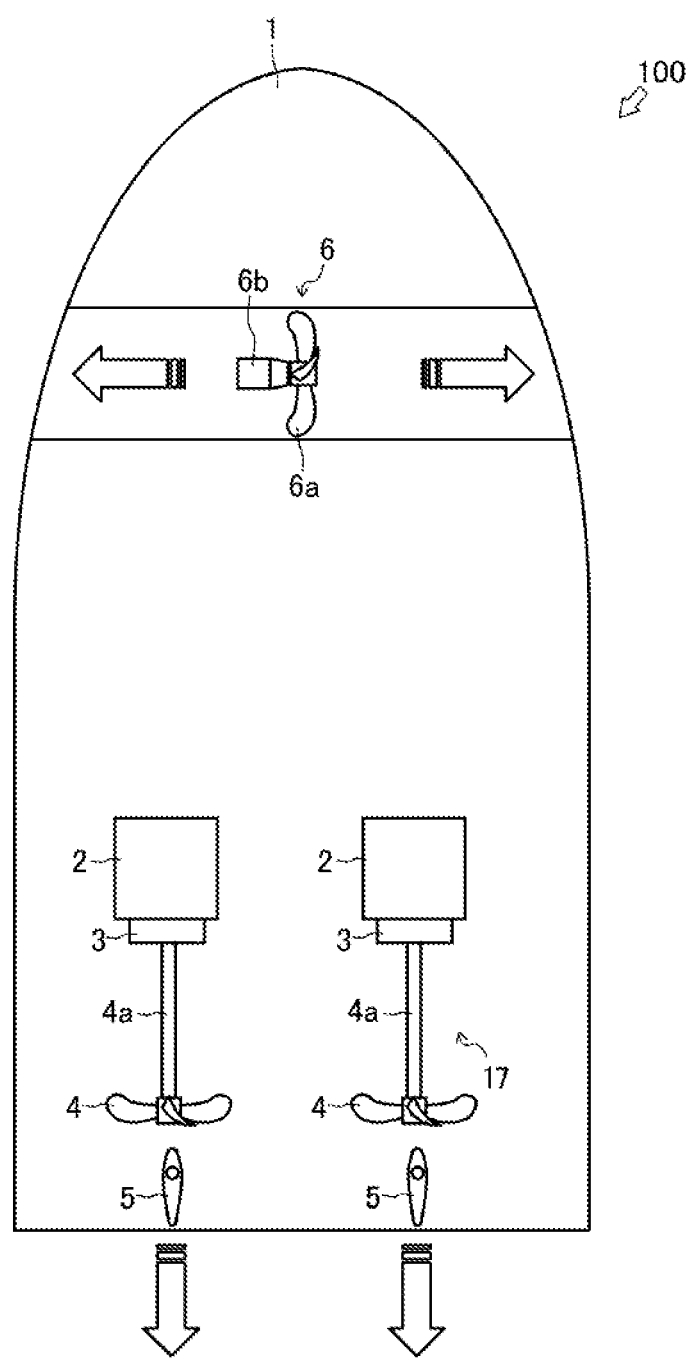
FIG. 2 A plane view schematically illustrating arrangement of a side thruster and forward-backward propellers in the ship including the ship handling device according to the embodiment.

As illustrated in FIGS. 1 and 2, the ship 100 is a shaft ship in which driving forces from engines 2, which are a driving force source, are transmitted to forward-backward propellers 4 through propeller shafts 4a. The ship 100 has a ship body 1 provided with a propulsion device 17 and the ship handling device 7. The propulsion device 17 includes the engines 2, switching clutches 3, the forward-backward propellers 4, rudders 5, a side thruster 6, and ECUs 16. The ship handling device 7 includes an accelerator lever 8, a steering wheel 9, a joystick lever 10, a side thruster controller 11, a monitor 12, a global positioning system (GPS) device 13, a heading sensor (orientation sensor) 14, and a ship handling control device 15. In the above description, the ship 100 is the shaft ship including the propulsion device 17 disposed in a port side and a starboard side of the ship 100. However, the ship 100 is not limited to such a configuration. Alternatively, the ship 100 may be another type of ship such as a stern drive ship.

The two engines 2 each generate a driving force for rotating a corresponding one of the forward-backward propellers 4 on the port side and the starboard side. One of the engines 2 is disposed in a rear portion of the port side of the ship body 1, and the other of the engines 2 is disposed in a rear portion of the starboard side of the ship body 1. The engines 2 each have an output shaft to which a corresponding one of the switching clutches 3 is connected.

The two switching clutches 3 switch a rotation direction of the driving force, transmitted from the output shafts of the engines 2, between a forward direction and a reverse direction, and output the resulting driving force. The switching clutches 3 each have an input side connected to a corresponding one of the output shafts 2 of the engines 2. The switching clutches 3 each have an output side connected to a corresponding one of the propeller shafts 4a. Thus, the switching clutches 3 are each configured to transmit the driving force from a corresponding one of the engines 2 to a corresponding one of the propeller shafts 4a.

The two forward-backward propellers 4 each generate a thrust in a front-and-rear direction. The forward-backward propellers 4 are respectively connected to the two propeller shafts 4a extending to the outside of the ship through a port-side portion and a starboard-side portion of the bottom of the ship body 1. The forward-backward propellers 4 are respectively rotated by the driving forces transmitted thereto from the engines 2 via the propeller shafts 4a. Multiple blades arranged around a rotating shaft of each of the propeller shafts 4a rotate in water in the periphery, so that a thrust is generated.

The two rudders 5 change the direction of a water flow generated by rotation of the forward-backward propellers 4. One of the rudders 5 is disposed at a rear end (stern side) of the port-side portion of the bottom of the ship 1 and in rear of a corresponding one of the forward-backward propellers 4. The other of the rudders 5 is disposed at a rear end (stern side) of the starboard-side portion of the bottom of the ship body 1 and in rear of a corresponding one of the forward-backward propellers 4. The rudders 5 are each capable of turning about its corresponding rotating shaft provided in the ship body 1, within a predetermined angle range in a left-and-right direction. The rudders 5 are interlockingly connected to the steering wheel 9. Thus, the rudders 5 are configured such that, when the steering wheel 9 is operated to cause rear ends of the rudders 5 to be directed to the right of the ship body 1, a thrust generated by the resulting water flow presses the stern of the ship 100 to the left, so that the bow of the ship 100 is directed to the right. Similarly, the rudders 5 are configured such that, when the steering wheel 9 is operated to cause the rear ends of the rudders 5 to be directed to the left of the ship body 1, a thrust generated by the resulting water flow presses the stern of the ship 100 to the right, so that the bow of the ship 100 is directed to the left.

The side thruster 6 generates a thrust in the left-and-right direction. The side thruster 6 is disposed in a location closer to the bow of the ship body 1 and in the center in the left-and-right direction. The side thruster 6 includes a propeller 6a and a motor 6b. The motor 6b is connected to the side thruster controller 11, and is rotatable at a desired rotation speed. The side thruster 6 is configured such that a thrust generated by the propeller 6a acts in the left-and-right direction of the ship body 1. The side thruster 6 drives the motor 6b according to a signal from the side thruster controller 11 to rotate the propeller 6a so that a thrust having a desired magnitude and acting in the left-and-right direction is generated.

The accelerator lever 8 included in the ship handling device 7 generates a signal for a rotation speed of the forward-backward propeller 4 on the port side, a signal for a rotation speed of the forward-backward propeller 4 on the starboard side, and signals for rotation directions of these forward-backward propellers 4. The accelerator lever 8 includes a lever for the forward-backward propeller 4 on the port side and a lever for the forward-backward propeller 4 on the starboard side. That is, the accelerator lever 8 is configured to independently generate a signal for the forward-backward propeller 4 on the port side and a signal for the forward-backward propeller 4 on the starboard side. The accelerator lever 8 is configured to be inclined at a desired angle in the front-and-rear direction of the ship 100. The accelerator lever 8 is configured to independently generate signals for rotation speeds of the engines 2 and signals for switching states of the switching clutches 3 corresponding to the engines 2, based on the direction and the amount of the operation. When the accelerator lever 8 is operated to be inclined forward, the accelerator lever 8 generates signals for the forward-backward propellers 4 to generate a thrust for moving the ship 100 forward. Meanwhile, when the accelerator lever 8 is operated to be inclined rearward, the accelerator lever 8 generates signals for the forward-backward propellers 4 to generate a thrust for moving the ship 100 backward.

The steering wheel 9 included in the ship handling device 7 is used to change turning angles of the rudders 5. The steering wheel 9 is interlockingly connected to the rudders 5 on the port side and on the starboard side via a wire link mechanism or a hydraulic circuit. When the steering wheel 9 is turned to the right, the rear ends of the rudders 5 are turned to be directed to the right. Consequently, a water flow generated by the forward-backward propellers 4 is directed to the right, so that the stern of the ship 100 is pressed to the left and accordingly the bow of the ship 100 is directed to the right. Similarly, when the steering wheel 9 is turned to the left, the rear ends of the rudders 5 are turned to be directed to the left. Consequently, a water flow generated by the forward-backward propellers 4 is directed to the left, so that the stern of the ship 100 is pressed to the right and accordingly the bow of the ship 100 is directed to the left.

Figure 3:
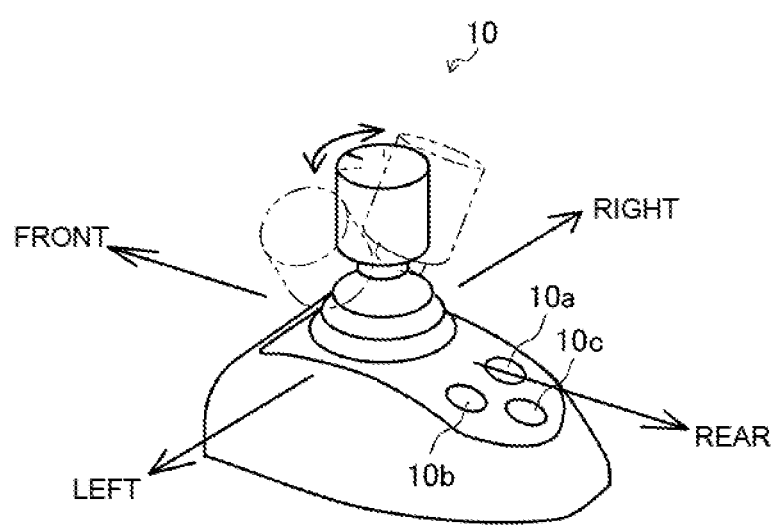
FIG. 3 A perspective view illustrating a configuration of a joystick lever of the ship handling device according to the embodiment.

As illustrated in FIGS. 1 and 3, the joystick lever 10 included in the ship handling device 7 generates a signal for causing the ship 100 to move in a desired direction. The joystick lever 10 is configured to be capable of being inclined in a desired direction at a desired angle. The joystick lever 10 can be operated to be turned about a lever shaft by a desired angle. The joystick lever 10 is configured to generate, based on the mode and the amount of the operation, signals for rotation speeds of the engines 2 and switching states of the switching clutches 3 and signals for a rotation speed and a rotation direction of the side thruster 6. To be more specific, when the joystick lever 10 is operated to be inclined in a desired direction, the joystick lever 10 generates a signal for the forward-backward propellers 4 on both sides and a signal for the side thruster 6 to cause the ship 100 to move in a direction corresponding to the operation and with a thrust corresponding to the amount of the operation. When the joystick lever 10 is operated to turn about the lever shaft, the joystick lever 10 generates a signal for the forward-backward propellers 4 on both sides and a signal for the side thruster 6 to cause the ship 100 to turn in a desired direction and with a thrust corresponding to the amount of the operation.

The joystick lever 10 is provided with a positioning switch 10a for giving an instruction to start dynamic positioning control, a calibration switch 10b for causing the ship 100 to move laterally, to move obliquely, and to make a turn, and a change switch 10c for changing various settings.

The dynamic positioning control refers to a control for causing the ship 100 to move toward a desired coordinate position, directing the bow of the ship 100 toward a desired orientation, and maintaining the ship 100 at that position.

The side thruster controller 11 included in the ship handling device 7 is used to drive the side thruster 6. When the side thruster controller 11 is operated to be turned on, the side thruster controller 11 causes the motor 6b of the side thruster 6 to rotate in a desired direction so that the propeller 6a of the side thruster 6 generates a thrust in the left-and-right direction.

The GPS device 13 included in the ship handling device 7 measures (calculates) positional coordinates of the ship 100. The GPS device 13 receives signals from a plurality of GPS satellites, calculates positional coordinates of the ship 100, and outputs a latitude La (n) and a longitude Lo (n) representing the current position. That is, as a position calculating device, the GPS device 13 calculates absolute values of the positional coordinates of the ship 100.

The heading sensor 14, which is an orientation calculating device and is included in the ship handling device 7, measures (calculates) a direction of the ship 100. The heading sensor 14 calculates an orientation of the bow of the ship 100 from the Earth's magnetic field. That is, the heading sensor 14 calculates an absolute orientation of the bow of the ship 100.

As illustrated in FIG. 1, each of the ECUs 16 controls a corresponding one of the engines 2. In each of the ECUs 16, various programs and data for controlling a corresponding one of the engines 2 are stored. The ECUs 16 are provided for their respective engines 2. Each of the ECUs 16 may have a configuration in which a CPU, a ROM, a RAM, an HDD and/or the like are connected to each other via a bus, or may have a configuration including a single-chip LSI and/or the like.

Each of the ECUs 16 is connected to components of a corresponding one of the engines 2, such as a fuel adjustment valve of a fuel supply pump, a fuel injection valve, and various sensors (these components are not illustrated). The ECU 16 is capable of controlling an opening degree of the fuel adjustment valve and opening/closing of the fuel injection valve, and is also capable of obtaining information detected by various sensors.

The ship handling control device 15 included in the ship handling device 7 controls the engines 2, the switching clutches 3, and the side thruster 6 based on detection signals from, e.g., the accelerator lever 8, the steering wheel 9, and the joystick lever 10. The ship handling control device 15 may be configured to be capable of implementing so-called automatic navigation that enables automatic handling of the ship along a route calculated from the current position and the preset destination based on the information from the GPS device 13.

In the ship handling control device 15, various programs and data for controlling the engines 2, the switching clutches 3, and the side thruster 6 are stored. The ship handling control device 15 may have a configuration in which a CPU, a ROM, a RAM, an HDD, and/or the like are connected to each other via a bus, or may have a configuration including a single-chip LSI and/or the like.

The ship handling control device 15 is connected to the switching clutches 3 and the ECUs 16 of the engines 2, and can obtain information indicative of states of the switching clutches 3, information indicative of operation states of the engines 2, information indicative of rotation speeds that the ECUs 16 obtain from various sensors, and various signals that the ECUs 16 obtain from various sensors.

The ship handling control device 15 can transmit, to the switching clutches 3, signals for changing (switching) clutch states.

The ship handling control device 15 can transmit, to the ECUs 16, signals for controlling the fuel adjustment valves of the fuel supply pumps, the fuel injection valves, and other various devices of the engines 2.

The ship handling control device 15 is connected to the accelerator lever 8 and the joystick lever 10, and can obtain signals from the acceleration lever 8 and the joystick lever 10.

The ship handling control device 15 is connected to the side thruster controller 11 of the side thruster 6, and can transmit a signal for controlling the side thruster 6.

The ship handling control device 15 is connected to the GPS device 13 and the heading sensor 14, and can obtain absolute coordinates and an absolute orientation of the ship 100.

The ship handling control device 15 is connected to the monitor 12, and can cause the monitor 12 to display the current position of the ship 100 and a state of ship handling by the joystick lever 10.

Figure 4:
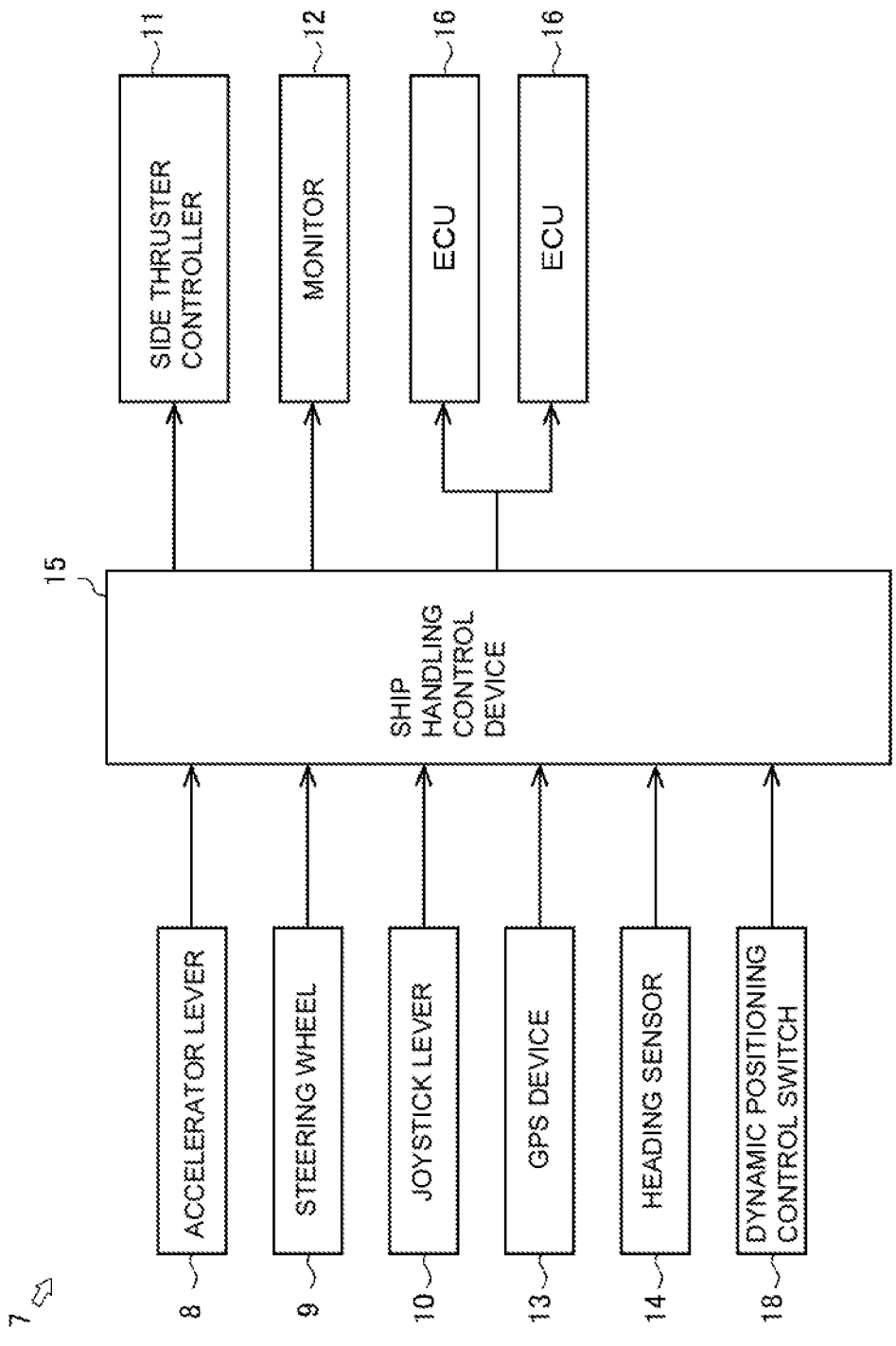
FIG. 4 A block diagram illustrating a control system for the ship handling device according to the embodiment.

Next, with reference to FIG. 4, the following will describe a configuration of the ship handling device 7 that includes the ship handling control device 15 and executes the dynamic positioning control for maintaining the ship 100 at a target position and a target orientation on the sea.

The ship handling control device 15 has the ROM, the RAM, and/or the like, as well as various arithmetic functions and a timer function. The ship handling control device 15 can calculate an external force acting on the ship 100 and a ship speed based on the position information from the GPS device 13 and the orientation information from the heading sensor 14. Then, the ship handling control device 15 further calculates a thrust setting value for achieving balance with the external force thus calculated, and controls the side thruster controller 11 and the ECUs 16 so that a thrust represented by the setting value is outputted.

The ship handling control device 15 is connected to a dynamic positioning control switch 18. The ship handling control device 15 can recognize turning on/off of the dynamic positioning control switch 18. The dynamic positioning control switch 18 is disposed at a location in the ship body 1 where the dynamic positioning control switch 18 is operable by an operator. The dynamic positioning control switch 18 may be the positioning switch 10*a* provided in the joystick lever 10, or may be another one, e.g., the one displayed on the monitor 12 of touch panel type.

Turning on the dynamic positioning control switch 18 starts the dynamic positioning control, whereas turning off the dynamic positioning control switch 18 cancels the dynamic positioning control. The dynamic positioning control has a silent mode. As will be described later, while the dynamic positioning control is active, if a predetermined condition for starting the silent mode is satisfied, a permission flag for the silent mode is set. Then, if a predetermined condition for the silent mode is satisfied, the dynamic positioning control in the silent mode is executed. If the predetermined condition is not satisfied while the dynamic positioning control in the silent mode is active, the silent mode is canceled and the normal dynamic positioning control is performed. Selection of whether to provide the silent mode in the dynamic positioning control can be made by a manufacturer in an initial setting. Specifically, as the ship handling device 7, it is possible to individually prepare a ship handling device 7 configured to be capable of executing the dynamic positioning control with the silent mode and a ship handling device 7 configured to execute the dynamic positioning control without the silent mode.

Next, the following will describe a condition for starting the dynamic positioning control for maintaining the ship 100 at a setting position and a setting orientation on the sea. Note that the driving force source of the ship 100 is not stopped and the propulsion device 17 is active on the sea while the dynamic positioning control is active.

Figure 5:
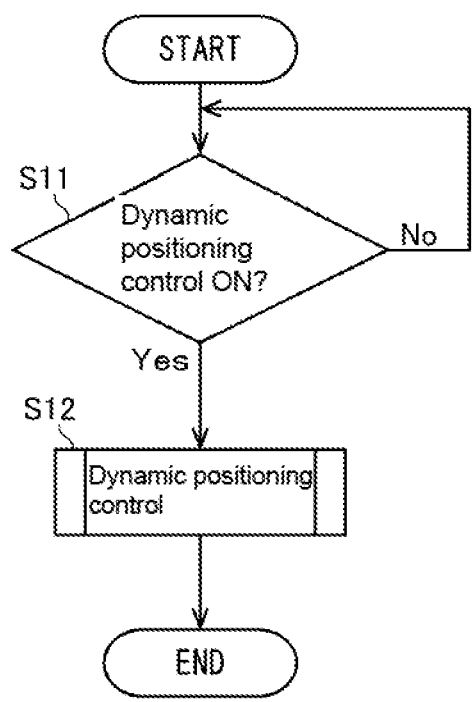
FIG. 5 A flowchart illustrating a condition for starting dynamic positioning control that can be executed by the ship handling device according to the embodiment.

As illustrated in FIG. 5, in step S11, it is determined whether or not an instruction to start the dynamic positioning control has been given. The dynamic positioning control is started when the dynamic positioning control switch 18 (see FIG. 4) is operated to be turned on. If the instruction to start the dynamic positioning control has been given, the process advances to step S12. The position and the orientation of the ship 100 on the sea at the time of turning-on of the dynamic positioning control switch 18 are set as a target position and a target orientation.

In step S12, the dynamic positioning control is executed. In the dynamic positioning control, the side thruster controller 11 and the ECUs 16 are controlled so that a thrust given by the propulsion device 17 is balanced with an external force including a wind force and a tidal force. According to control of the side thruster controller 11 and the ECUs 16, the ship 100 can be automatically maintained at a setting position and a setting orientation on the sea.

The ship handling control device 15 may be connected to a switch for giving an instruction to turn on/off of the silent mode (described later). For example, the switch for giving such an instruction may be the change switch 10*c* illustrated in FIG. 3. In this configuration, an operation made by the dynamic positioning control switch 18 takes precedence over an instruction given by the silent mode switch. Specifically, if the dynamic positioning control switch 18 is turned on and the silent mode switch is turned on, the silent mode enters a stand-by state, in which the silent mode is to be started upon satisfaction of a predetermined condition. Meanwhile, even if the silent mode switch is turned on, the silent mode is not executed as long as the dynamic positioning control switch 18 is off. Note that the silent mode switch may not be the change switch 10*c*, and may be another switch disposed in another position.

Figure 6:
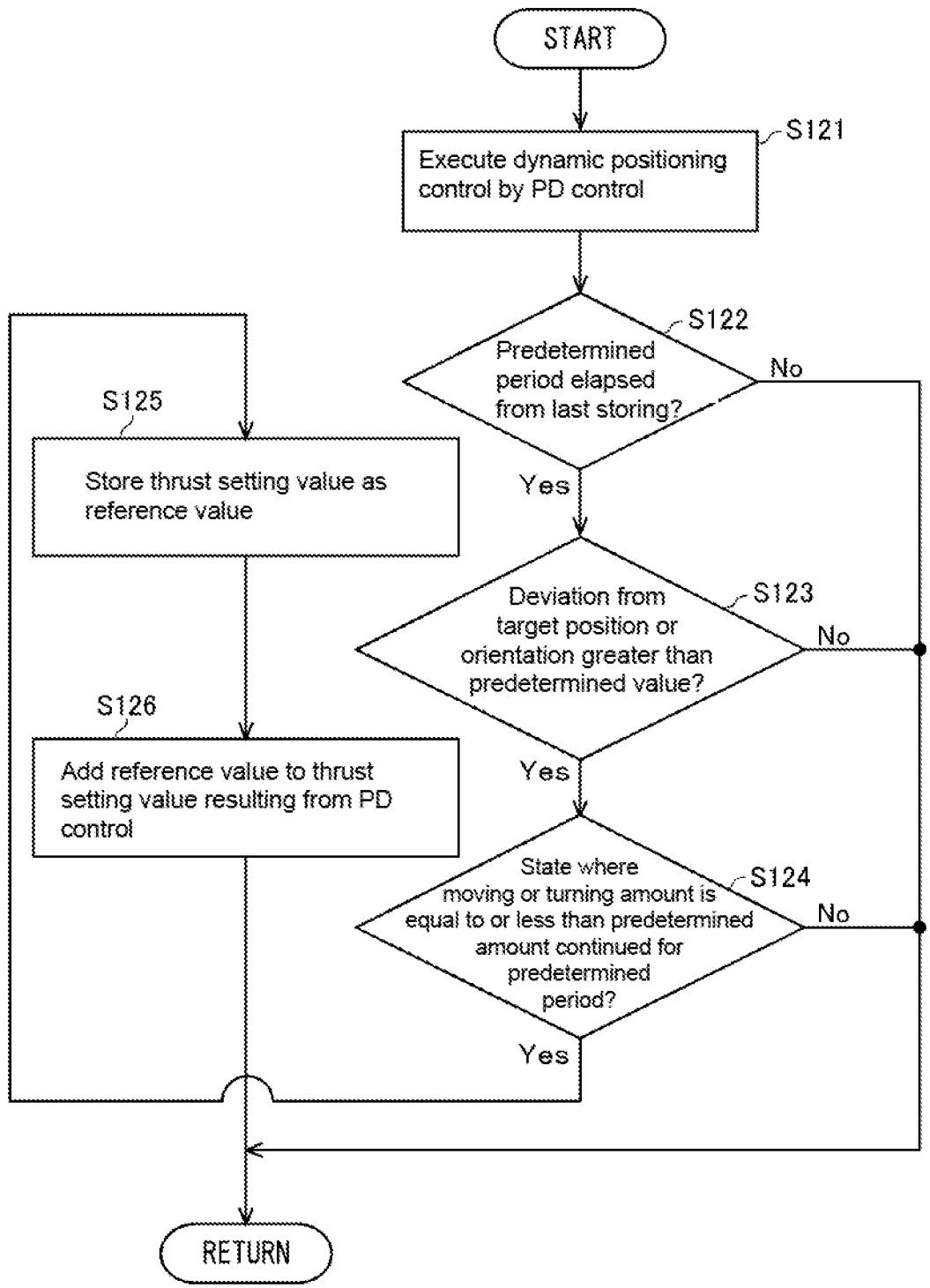
FIG. 6 A flowchart illustrating learning of an external force in the dynamic positioning control that can be executed by the ship handling device according to the embodiment.

Next, with reference to FIG. 6, the following will describe learning of an external force in the dynamic positioning control.

The learning of the external force refers to storing, as a reference value, a thrust setting value representing a thrust balanced with a relatively large external force acting on the ship 100 and consequently stopping movement of the ship 100 at a position away from a target position. As will be described below, the ship handling device 7 efficiently learns the external force acting on the ship 100, and thus the ship handling device 7 can control the position and the orientation of the ship 100 efficiently and accurately.

Note that steps S122, S123, and S124 illustrated in FIG. 6 are parallel steps and thus the order of these steps may be changed.

In the dynamic positioning control, a position of the ship 100 is controlled by proportional-derivative (PD) control as in step S121.

Concurrently with step S121, it is determined in step S122 whether or not a predetermined period of time has been elapsed from the last learning (i.e., from a time point when the reference value was stored). If the result of the determination in step S122 is "Yes", the process advances to step S123. Meanwhile, if the result of the determination in step S122 is "No", the process returns to step S121.

In step S123, it is determined whether or not a distance deviation from a target position having been set is greater than a predetermined value. In step S123, it is also determined whether or not an orientation deviation from a target orientation having been set is greater than a predetermined value. If the result of the determination in step S123 is "Yes", the process advances to step S124. Meanwhile, if the result of the determination in step S123 is "No", the process returns to step S121.

In step S124, it is determined whether or not a state where a moving amount of the ship 100 per unit time is equal to or less than a predetermined amount has continued for a predetermined period of time. In step S124, it is also determined whether or not a state where a turning amount of the ship 100 per unit time is equal to or less than a predetermined amount has continued for a predetermined period of time. If the result of the determination in step S124 is "Yes", the process advances to step S125. Meanwhile, if the result of the determination in step S124 is "No", the process returns to step S121. In this manner, in steps S123 and S124, it is determined whether or not, due to a thrust balancing with a large external force, the ship 100 has stopped moving at a position away from the target position before the ship 100 reaches the target position, and it is also determined whether or not, due to such a thrust, the ship 100 has stopped turning at an angle away from the target orientation before the ship 100 reaches the target orientation.

In step S125, a thrust setting value at the time of the determination in step S123 and the determination in step S124, i.e., a thrust setting value representing the thrust balanced with the external force is stored as a reference value.

In step S126, the reference value is added (vector added) to the thrust setting value resulting from the PD control. Steps S121 to S126 are performed in a repeated manner, and a new reference value is stored each time these steps are completed, i.e., the reference value is updated each time these steps are completed. Thereafter, the dynamic positioning control including the reference value thus added is executed by the PD control. As a result of the learning of the external force performed in such a manner, the reference value is added to the feedback term of the PD control. This makes it possible to cancel the external force acting on the ship 100, and to calculate a thrust setting value used to cause the ship 100 to move closer to the target position.

In this manner, according to the dynamic positioning control, it is determined whether or not the external force and the thrust are balanced with each other, based on the determination of whether or not the deviation from the target position or the target orientation is greater than the threshold (step S123) and the determination of whether or not the state where the moving amount or the turning amount of the ship 100 per unit time is equal to or less than the predetermined amount has continued for the predetermined period of time (step S124). In order to avoid a reflection of a moving amount of the ship 100 caused by a temporal displacement of the ship due to, e.g., tidal waves, the subject of the learning is set only to the amount of the control performed according to the distance deviation and the orientation deviation.

The thrust setting value balanced with the external force is stored as the reference value. Thereafter, the dynamic positioning control is executed with use of the feedback term and the reference value that are vectors added together. That is, according to the dynamic positioning control by the ship handling device 7, in a case where a relatively large external force acts on the ship, the external force is canceled by the reference value in the thrust setting value resulting from the PD control. In this manner, the dynamic positioning control by the ship handling device 7 creates a situation that is the same as a situation in which no external force acts on the ship, in terms of control. This enables the ship 100 to follow the target position and the target orientation efficiently and accurately.

That is, the dynamic positioning control by the ship handling device 7 has a control mode capable of automatically detecting stop of the movement of the ship 100 caused by a thrust balanced with an external force acting on the ship 100 and of canceling the external force acting on the ship 100. Consequently, as compared with a configuration in which, each time one cycle of the control is completed, an external force is obtained by, e.g., calculation and the external force thus obtained is added to a thrust setting value that is to be outputted, it is possible to reduce overshoot and hunting.

Furthermore, since the dynamic positioning control by the ship handling device 7 has an interval before next learning as in step S123, it is possible to avoid hunting and divergence in operation of the ship 100 that may otherwise be caused by executing next learnings without an interval.

Figure 7:
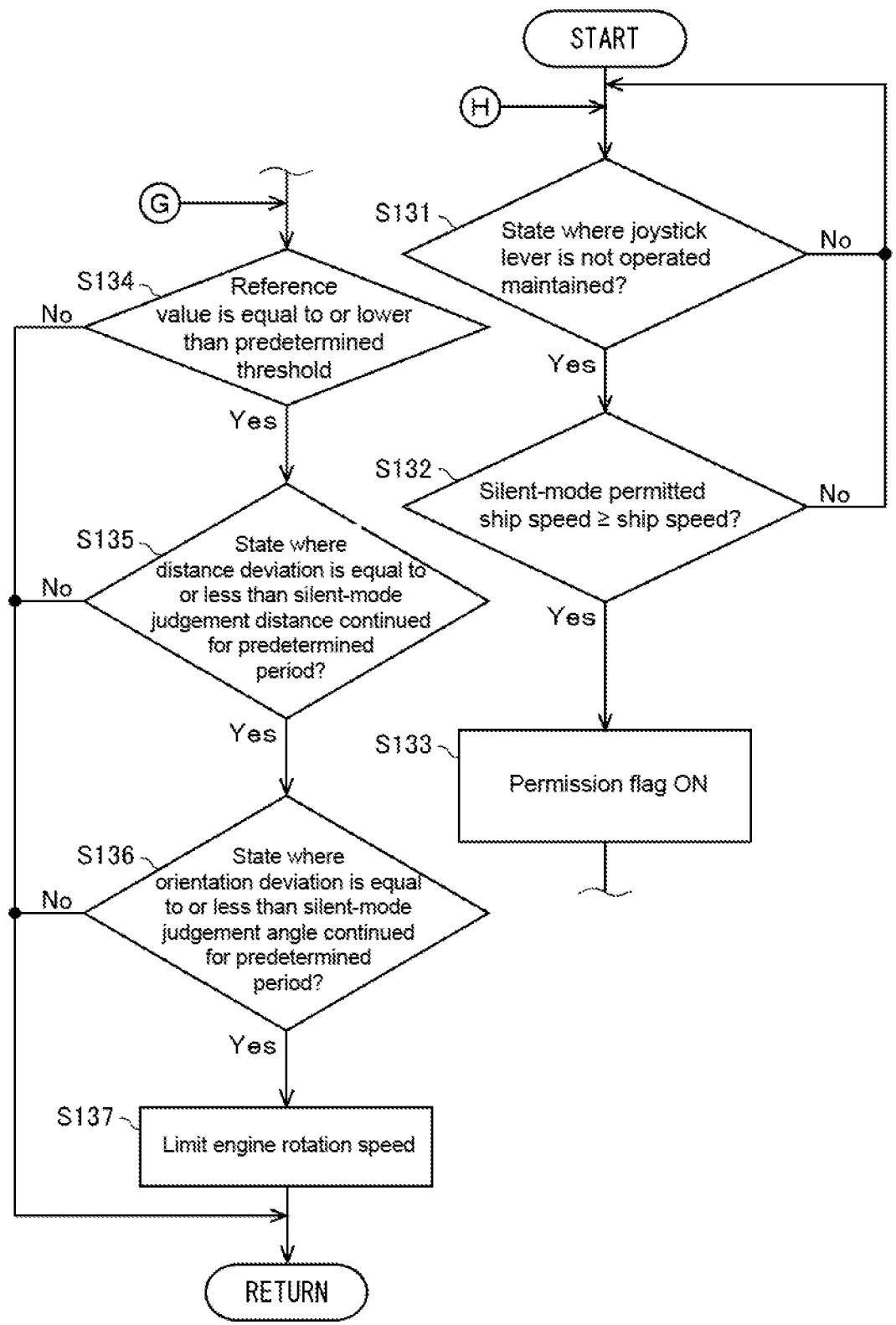
FIG. 7 A flowchart illustrating a control for determining whether to execute a silent mode in the dynamic positioning control that can be executed by the ship handling device according to the embodiment.

Next, with reference to FIG. 7, the following will describe a flow of a control for determining whether to execute the silent mode in the dynamic positioning control. The silent mode refers to a mode in which an upper limit is set on the rotation speeds of the engines 2 so that the ship 100 archives quietness, comfortability, and the like. In the silent mode, the engines 2 are each operated in a low idle rotation speed. Specifically, in the silent mode, the upper-limit rotation speed of each of the engines 2 is set at 550 rpm, for example.

First, as a precondition for the steps illustrated in FIG. 7, it is determined whether or not an activation switch for the silent mode has been turned on, i.e., whether or not the ship handling device 7 is set in a mode in which the silent mode is executable. In the initial setting of the ship handling device 7, the silent mode is set to be executable. Therefore, the result of this determination is "Yes". Meanwhile, in a case where the silent mode switch is provided as described above, it is determined, in a step prior to step S131, whether or not the silent mode has been canceled by turning-off operation by the silent mode switch. If the result of this determination is "Yes", the process advances to step S131. Meanwhile, if the result of this determination is "No", step S131 and its subsequent steps are not executed, but the normal dynamic positioning control is executed.

In step S131, it is determined whether or not a state where the joystick lever 10 is not operated is maintained. If the result of this determination is "Yes", the process advances to step S132. Meanwhile, if the result of this determination is "No", step S131 is performed again. Assume here that the joystick lever 10 has not been operated since the instruction to start the dynamic positioning control was given (step S11 (see FIG. 5)). Thus, the result of the determination in step S131 is "Yes".

Of the dynamic positioning control and an operation by the joystick lever 10, a higher priority is given to the operation by the joystick lever 10. Thus, upon completion of the operation by the joystick lever 10, the dynamic positioning control is executed again. That is, at the time of completion of the operation by the joystick lever 10 (or after a predetermined period of time has elapsed after that time), the dynamic positioning control is automatically started again.

In step S132, it is determined whether or not a ship speed is equal to or lower than a silent-mode permitted ship speed. The silent-mode permitted ship speed is preset at a predetermined ship speed of the ship 100 that is obtained at an output lower than the minimum value of an output range of the engines 2 in which the silent mode is inexecutable. If the result of this determination is "Yes", the process advances to step S133. Meanwhile, if the result of this determination is "No", the process returns to step S131.

In step S133, the permission flag for the execution of the silent mode is turned on. That is, if the two conditions of the above-described steps S131 and S132 are satisfied, the execution of the silent mode is permitted in the dynamic positioning control.

In step S134, it is determined whether or not a reference value is equal to or lower than a predetermined threshold. Specifically, in step S134, it is determined whether or not an external force acting on the ship 100 is small enough to allow execution of the silent mode. If the result of this determination is "Yes", the process advances to step S135.

In step S135, it is determined whether or not a state where a distance deviation from a target position is equal to or less than a silent-mode judgement distance has continued for a predetermined period of time. Specifically, in step S135, it is determined whether or not the position of the ship 100 relative to the target position is continuously within a range in which the silent mode is executable. If the result of this determination is "Yes", the process advances to step S136.

In step S136, it is determined whether or not a state where an orientation deviation from a target orientation is equal to or less than a silent-mode judgement angle has continued for a predetermined period of time. Specifically, in step S136, it is determined whether or not the orientation of the bow of the ship 100 relative to the target orientation continuously stays within an angle range in which the silent mode is executable. If the result of this determination is "Yes", the process advances to step S137.

In step S137, the dynamic positioning control in the silent mode is executed by the PD control. Specifically, in a state where the rotation speeds of the engines 2 are limited more severely than those of the normal dynamic positioning control, the position of the ship 100 is controlled toward the target position and the target orientation. Note that steps S134, S135, and S136 illustrated in FIG. 7 are parallel steps and thus the order of these steps may be changed.

Figure 8:
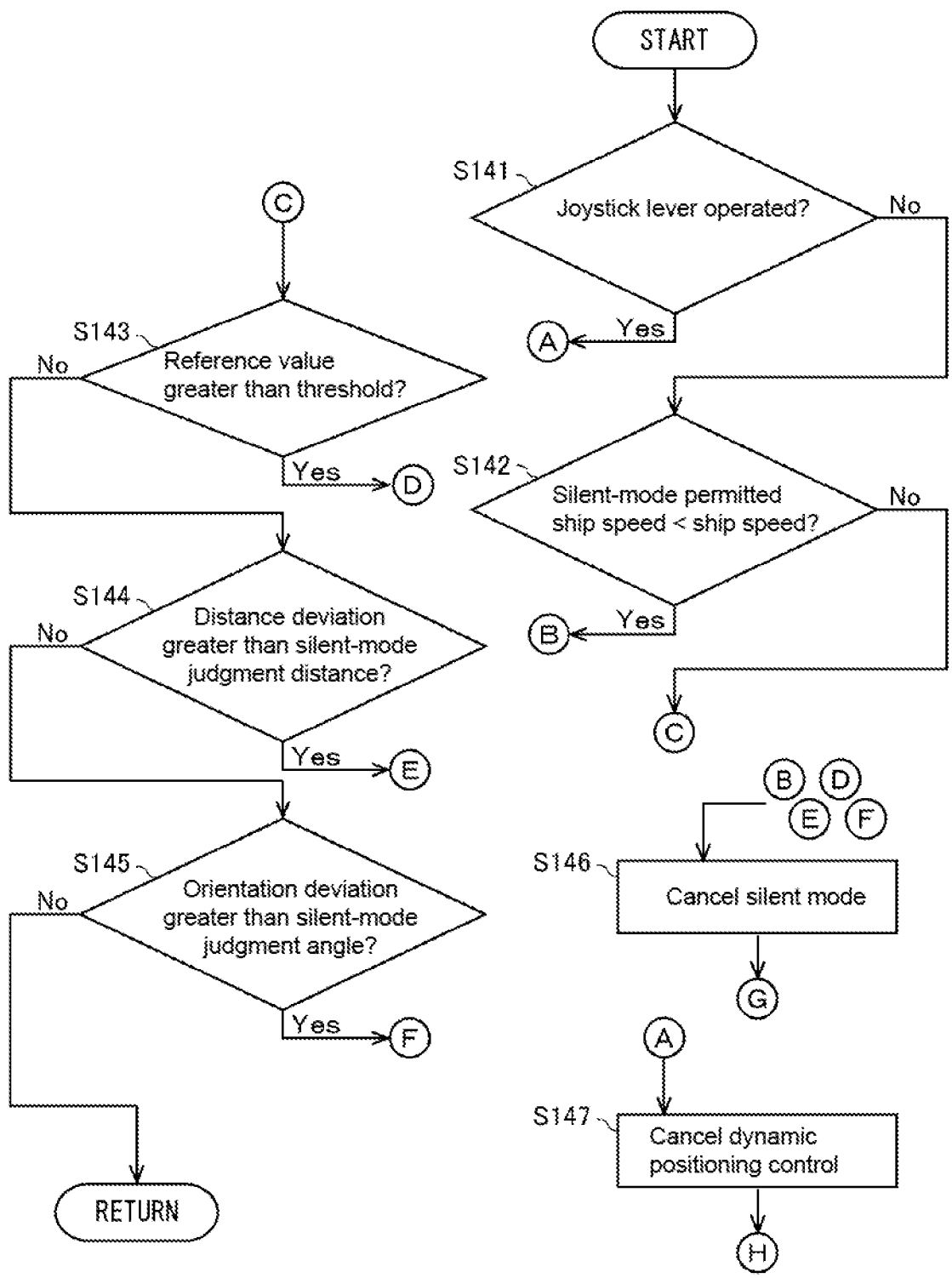
FIG. 8 A flowchart illustrating a control for determining whether to cancel the silent mode in the dynamic positioning control that can be executed by the ship handling device according to the embodiment.

Next, with reference to FIG. 8, the following will describe a flow of a control for determining whether to cancel the silent mode that has been permitted. As described below, if any of the conditions illustrated in FIG. 8 is satisfied, the silent mode is canceled and the normal dynamic positioning control in which the rotation speeds of the engines 2 are not limited is started.

In step S141, it is determined whether or not the joystick lever 10 has been operated. If the result of this determination is "Yes", the process advances to step S147. Meanwhile, if the result of this determination is "No", the process advances to step S142.

In step S142, it is determined whether or not a ship speed is higher than the silent-mode permitted ship speed. If the result of this determination is "Yes", the process advances to step S146. Meanwhile, if the result of this determination is "No", the process advances to step S143.

In step S143, it is determined whether or not a reference value is greater than the predetermined threshold. If the result of this determination is "Yes", the process advances to step S146. Meanwhile, if the result of this determination is "No", the process advances to step S144. That is, in step S143, it is determined whether or not an external force that is too large to execute the silent mode is acting on the ship 100.

In step S144, it is determined whether or not a distance deviation from a preset target position is greater than the silent-mode judgement distance. If the result of this determination is "Yes", the process advances to step S146. Meanwhile, if the result of this determination is "No", the process advances to step S145. The silent-mode judgement distance is preset at an upper-limit distance deviation from the target position at which the silent mode can be continued. That is, in step S144, it is determined whether or not the ship 100 is largely away from the target position to an extent not allowing the silent mode to be continued.

In step S145, it is determined whether or not an orientation deviation from a preset target orientation is greater than the silent-mode judgement angle. If the result of this determination is "Yes", the process advances to step S146. Meanwhile, if the result of this determination is "No", the process returns to step S141. The silent-mode judgement angle is preset at an upper-limit orientation deviation from the target orientation at which the silent mode can be continued. That is, in step S145, it is determined whether or not the bow of the ship 100 is largely inclined from the target orientation to an extent not allowing the silent mode to be continued.

In step S146, the silent mode is canceled. However, even after the silent mode is canceled, the silent mode can be executed again if the three conditions of steps S134, S135, and S136 illustrated in FIG. 7 are satisfied (see Gin FIGS. 7 and 8).

Then, if any of the conditions of steps S142, S143, S144, and S145 illustrated in FIG. 8 is satisfied, the silent mode thus executed again is canceled, and then the normal dynamic positioning control is started.

INDUSTRIAL APPLICABILITY

The present invention is applicable to ship handling devices.

REFERENCE SIGNS LIST 2 engine (driving force source)
7 ship handling device

13 GPS device (position calculating device)
14 heading sensor (orientation calculating device)
15 ship handling control device
17 propulsion device
100 ship

The invention claimed is:

1. A ship handling device for a ship, comprising:
at least one driving force source;
a propulsion device;
a position calculating device configured to calculate a position of the ship; and
an orientation calculating device configured to calculate an orientation of the ship, wherein
the ship handling device is configured to:
execute a dynamic positioning control for balancing a thrust of the ship with an external force acting on the ship, and
while the dynamic positioning control is active:
in a case where a distance deviation from a target position is greater than a predetermined value and a first condition in which a moving amount per unit time is equal to or less than a predetermined amount has continued for a predetermined period, or
in a case where an orientation deviation from a target orientation is greater than a predetermined value and a second condition in which a turning amount per unit time is equal to or less than a predetermined amount has continued for a predetermined period,
store a first thrust setting value resulting from the dynamic positioning control at a time of determination on the first condition or the second condition as a reference value, and
add the reference value to a second thrust setting value subsequently resulting from the dynamic positioning control.

2. The ship handling device according to claim 1, further comprising a joystick lever, wherein
while the joystick lever is not operated,
in a case where a ship speed is equal to or lower than a predetermined ship speed,
in a case where the reference value is equal to or lower than a threshold,
in a case in which the distance deviation from the target position is equal to or less than a predetermined distance has continued for a predetermined period of time, or
in a case in which the orientation deviation from the target orientation is equal to or less than a predetermined angle has continued for a predetermined period of time, then
the ship handling device executes the dynamic positioning control in which the driving force source is operated at a rotation speed equal to or lower than a preset upper limit.

3. The ship handling device according to claim 1, wherein
while a joystick lever is not operated,
in a case where a ship speed is higher than a predetermined ship speed,
in a case where the reference value is greater than a threshold,
in a case where the distance deviation from the target position is greater than a predetermined distance, or
in a case where the orientation deviation from the target orientation is greater than a predetermined angle, then
the ship handling device continuously performs a dynamic positioning control in which a present upper limit on a rotation speed of the driving force source is canceled.

4. The ship handling device according to claim 1, further comprising a controller configured to execute the dynamic positioning control.

5. The ship handling device according to claim 4, wherein:
the at least one driving force source is coupled to the controller;
the propulsion device coupled to the at least one driving force source; and
the position calculating device coupled to the controller.

6. The ship handling device according to claim 5, wherein:
the at least one driving force source comprises one or more engines;
the propulsion device comprises:
one or more propellers, and
one or more propeller shafts coupled to the one or more propellers; and the position calculating device comprises a global positioning device.

7. The ship handling device according to claim 4, wherein the position calculating device comprises a global positioning device coupled to the controller and configured to:
receive signals from a plurality of satellites;
determine absolute values of positional coordinates of the ship based on the received signals; and
transmit an indication of the absolute values based on the received signals.

8. The ship handling device according to claim 7, wherein the controller is further configured to:
receive the indication of the absolute values;
determine, based on the received indication, the position of the ship and the moving amount per unit time of the ship;
compare the position of the ship to the target position;
compare the moving amount per unit time of the ship to the predetermined amount; and
compare a first amount of time in which the first condition is met to the predetermined period.

9. The ship handling device according to claim 4, further comprising:
a joystick lever coupled to the controller, the joystick lever configured to provide an input to the controller that indicates an operational state of the joystick lever;
wherein the controller is further configured to, based on the joystick lever being in a non- operational state:
determine whether the moving amount per unit time is less than or equal to a third predetermined value;
determine whether the reference value is less than or equal to a fourth predetermined value;
determine whether the distance deviation between the position of the ship and the target position is less than or equal to a fifth predetermined value, the fifth predetermined value different from the predetermined value; and
determine a second amount of time that the distance deviation between the position of the ship and the target position is less than or equal to the fifth predetermined value.

10. The ship handling device according to claim 9, wherein the controller is further configured to operate one or more engines at a rotation speed less than or equal to a preset upper limit, based on:

a determination that the moving amount per unit time is less than or equal to the third predetermined value;

a determination that the reference value is less than or equal to the fourth predetermined value; or a determination that the second amount of time is greater than or equal to a second predetermined amount of time.

11. The ship handling device according to claim 9, wherein the controller is further configured to cancel a preset upper limit set on one or more engines, based on:

a determination that the moving amount per unit time is greater than the third predetermined value;

a determination that the reference value is greater than the fourth predetermined value; or a determination that the second amount of time is greater than a second predetermined amount of time.

12. The ship handling device according to claim 4, wherein:

the at least one driving force source coupled to the controller;

the propulsion device coupled to the at least one driving force source; and the orientation calculating device coupled to the controller.

13. The ship handling device according to claim 12, wherein:

the at least one driving force source comprises one or more engines;

the propulsion device comprises:
one or more propellers, and
one or more propeller shafts coupled to the one or more propellers; and the orientation calculating device comprises a heading sensor.

14. The ship handling device according claim 4, wherein the orientation calculating device comprises a heading sensor coupled to the controller and configured to:

determine an absolute orientation of a bow of the ship based on the Earth's magnetic field; and transmit an indication of the absolute orientation.

15. The ship handling device according to claim 14, wherein the controller is further configured to:

receive the indication of the absolute orientation;

determine, based on the received indication, the orientation of the ship and a rotation speed of the ship;

compare the orientation of the ship to the target orientation;

compare the rotation speed of the ship to the predetermined amount; and compare a first amount of time in which the first condition is met to the predetermined period.

16. The ship handling device according to claim 4, further comprising a joystick lever coupled to the controller, the joystick lever configured to provide an input to the controller that indicates an operational state of the joystick lever.

17. The ship handling device according to claim 4, wherein the controller is further configured to, based on a joystick being in a non-operation state:

determine whether the reference value is less than or equal to a third predetermined value;

determine whether the orientation deviation between the orientation of the ship and the target orientation is less than or equal to a fourth predetermined value, the fourth predetermined value different from the predetermined value; and determine a second amount of time that the orientation deviation between the orientation of the ship and the target orientation is less than or equal to the fourth predetermined value.

18. The ship handling device according to claim 17, wherein the controller is further configured to operate one or more engines at a rotation speed less than or equal to a preset upper limit, based on:

a determination that the reference value is less than or equal to the third predetermined value; or a determination that the second amount of time is greater than or equal to a second predetermined amount of time.

19. The ship handling device according to claim 17, wherein the controller is further configured to cancel a preset upper limit set on one or more engines, based on:

a determination that the reference value is greater than the third predetermined value; or a determination that the second amount of time is greater than a second predetermined amount of time.

* * * * *